June 17, 1947.    H. H. HARMON    2,422,238
INTERNAL-COMBUSTION ENGINE
Filed Nov. 10, 1945
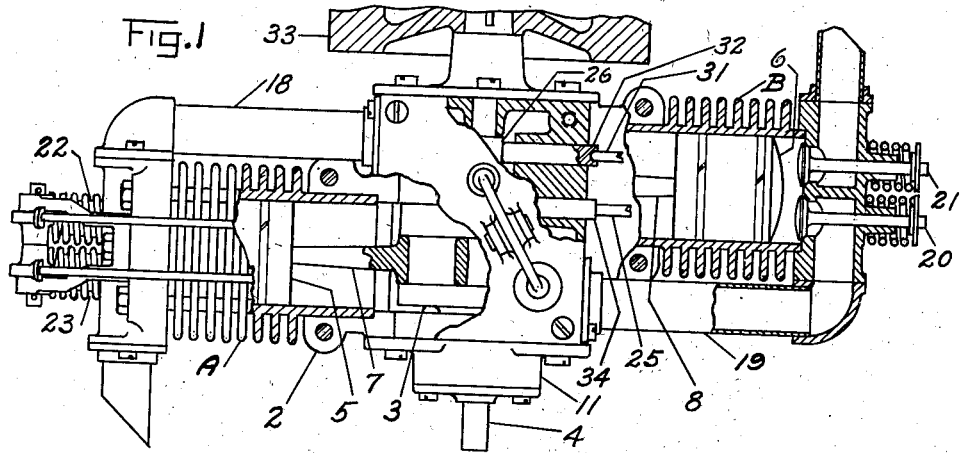
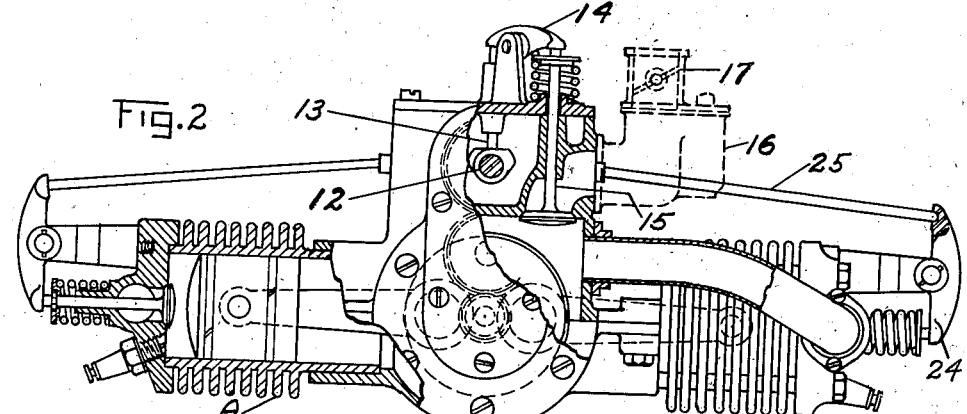
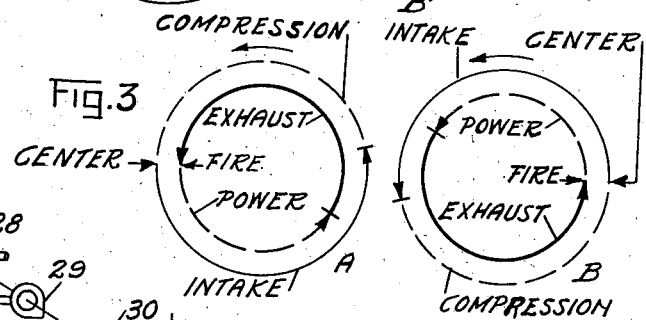
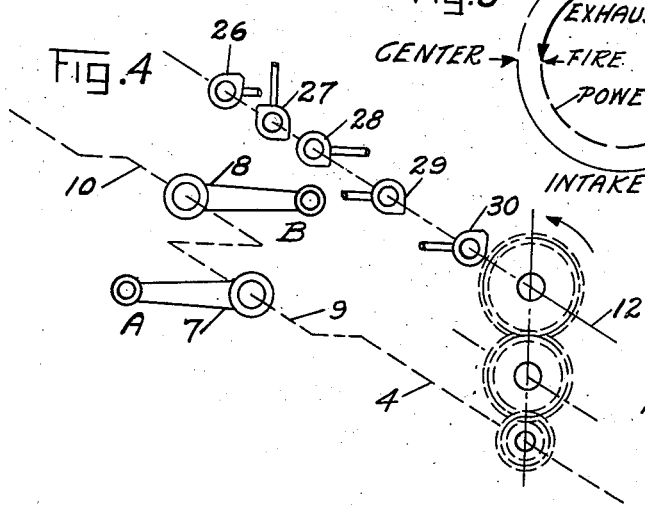
INVENTOR.
Herbert H. Harmon
BY
Forest B. Hitchcock
his Attorney Patented June 17, 1947

2,422,238

UNITED STATES PATENT OFFICE 2,422,238

INTERNAL-COMBUSTION ENGINE

Herbert H. Harmon, Rochester, N. Y.

Application November 10, 1945, Serial No. 627,923

12 Claims. (Cl. 123—56)

This invention relates to an internal combustion engine, and more particularly pertains to that type commonly termed a four cycle or four-stroke engine.

In a gas engine of the internal combustion type, it is desirable to employ the principles of the so called four cycle engine in order to obtain the greatest efficiency from the expanded gas mixture by reason of the distinct and separate portions of time allotted to the intake, combustion, compression and exhaustion of the gases in each cylinder. Such an engine is constructed to operate with a predetermined compression ratio for a given speed in normal air pressures. It is of course to be understood that such predetermined compression ratio is limited in an engine operating at normal speed, since too great a compression ratio would cause prefiring and result in improper operation. However, an increase in speed or a decrease in air pressure results in decreased charging of each cylinder with gas mixture, thus resulting in decreased compression and decreased power output. This has resulted in the development of supercharging apparatus which may be added to such an engine to overcome the difficulty just explained.

In view of the above considerations, it is proposed in accordance with the principles of the present invention to provide a four cycle internal combustion engine with self contained supercharging features effected by the regular engine structure.

Without attempting to define the exact nature or scope of the present invention, it is proposed to provide a four cycle engine with crank case compression of the gas mixture under control of the regular throttle, which compressed gas mixture is transferred to the several cylinders during their respective intake strokes to thereby provide a supercharging operation. This is accomplished by providing an engine having its cylinders divided into pairs, the cylinders of each pair coacting to provide the crank case compression of the gas mixture for transference to the opposite cylinders of that pair alternately on their respective intake strokes.

A throttle is provided to govern the available amount of gas mixture which is supplied to the crank case thus determining the crank case compression. This controlled crank case compression is then used to provide the charge of each cylinder during its intake stroke. In this way the throttle directly governs the charge of the respective cylinders.

The crank case compression is produced for each pair of cylinders by reason of the operation of its pistons rather than by additional apparatus. This is accomplished by arranging the cylinders of each pair in oppositely disposed positions with their pistons connected to the crank shaft so as to travel in opposite directions. Each time the pistons move outwardly they draw a throttle controlled gas charge into the crank case through a valve which closes when this operation is completed. Then each time the pistons move inwardly they raise the crank case compression to the proper pressure for concurrently transferring such gas charge to the particular cylinder of the pair then performing its intake stroke. Each cylinder is of course provided with suitable intake and exhaust valves so that it is apparent that each cylinder will perform its four cycle function. Since the cylinders are offset in their timing relations by 180°, and the firing of each cylinder occurs substantially at dead center for its respective cylinder following the compression stroke, then it will be apparent that there is a power stroke for one cylinder of the pair for each revolution of the associated crank shaft. This provides an efficient engine having a simple supercharging organization formed by the regular operating parts of the engine and yet under the complete control of the regular gas throttle. Such a supercharging organization, although it has its limits in the amount of charge that it may force into a cylinder, accomplishes its functions by means which follows the existing speed of the engine without making it necessary to provide for overrun and the like as is the case in prior supercharging apparatus.

Various other objects, purposes and characteristic features of the present invention will be in part obvious from the accompanying drawings and in part pointed out as the description of the invention progresses.

In describing the invention in detail, reference will be made to the accompanying drawings, in which like reference characters designate corresponding parts throughout the several views, and in which:

Fig. 1 shows a top plan view of an engine embodying the present invention with certain parts shown in cross section;

Fig. 2 shows a side elevation of the engine embodying the present invention with certain parts shown in section;

Fig. 3 represents a simplified timing chart for the engine embodying the present invention to illustrate the relationships between the operations of each pair of cylinders; and Fig. 4 shows diagrammatically the relationship between the pair of pistons and the camshaft operating their valves.

While certain features of the invention are applicable to and useable with various types and arrangements of cylinders in gas engines, it is to be understood that the specific embodiment has been selected for the purpose of illustrating the principles of the invention rather than for the purpose of showing the exact structure which may be most desirable for accomplishing its purposes in actual practice. Also, the illustrations have been greatly simplified, certain conventional structures of engines being assumed, rather than showing in great detail the exact structure of each and every part, since it is believed that a ready understanding of the general principles and operation of an engine constructed according to the present invention is more to be desired than the knowledge of the exact structure of each part.

With reference to Fig. 1 of the drawings, it will be noted that a cylinder A is mounted on the left side of a crank case 2 while a cylinder B is mounted on the right side of such crank case 2. These cylinders A and B are shown oppositely disposed by exactly 180° for the preferred embodiment but it should be understood that the same principles of operation may be embodied in a structure where the cylinders are oppositely disposed at a smaller angle. Each cylinder casing is shown as being provided with air cooling fins. A crank shaft 4 passes through the crank case 2 in such a position that the pistons 5 and 6 of each cylinder can have their respective connecting rods 7 and 8 connected to the crank shaft 4 in a manner to cause the respective pistons 5 and 6 to be operated in opposite directions. The pistons 5 and 6 will of course be provided with the usual piston rings and constructed in the usual well known manner.

The relationships between the pistons for cylinders A and B can best be seen in the diagram of Fig. 4, which diagram will be explained in detail later. For the present, it is sufficient to note that the indicated crank shaft 4 has extending cranks 9 and 10 for cylinders A and B respectively, to which the pistons 5 and 6 are connected by their respective connecting rods 7 and 8.

The crank shaft 4 extends through the crank case (see Fig. 1), and at the lower end is provided with a timing gear box 11 which includes suitable gearing indicated in Figs. 2 and 4 but not shown in detail, so that the crank shaft acts to drive a cam shaft 12. This cam shaft 12 acts to operate through rod 13 the rocker arm 14 to move the valve 15 associated with the intake of the crank case for the particular pair of cylinders illustrated. The intake valve 15 is biased by a suitable coil spring to a closed position. The intake connection of this valve extends to a suitable carburetor indicated at 16 which is provided with a butterfly control throttle 17. As indicated in Fig. 2 the carburetor is directly connected to the intake of the crank case, but when a plurality of pairs of cylinders are employed a single carburetor would probably be used for several pairs, thus necessitating suitable manifolds extending between the crank case compartment of each pair to the main carburetor output.

Extending from the crank case to each cylinder are suitable transfer manifolds 18 and 19, which manifold 19 as seen in Fig. 1 for the cylinder B extends to the intake valve 20 for that cylinder.

With reference to Fig. 1, it can be seen that cylinder B has an intake valve 20 and an exhaust valve 21 both biased to closed positions by suitable springs. Similarly, cylinder A is provided with an intake valve 22 and an exhaust valve 23. In Fig. 2, it will be seen that the intake valve of cylinder B is operated through a rocker arm 24 and a rod 25 which extends to a tappet 34 that rides on a timing cam to open and close at the proper times, as will be explained in greater detail in connection with Fig 4. In brief, each cylinder is provided with its intake and exhaust valves which are operated by the cam shaft through suitable rods. Each of these valves is illustrated as being of the poppet valve type having suitable coil springs normally biasing the valves to their closed positions. This is also true of the intake valve for the crank case. Thus, the valves are opened at appropriate times by the operation of the cam shaft operating through suitable rods to open the valves as required. Since such structures are well known in the art, this portion of the invention has not been shown in detail, although in Fig. 2 it can be seen that the operating rod 13 rides directly on the cam attached to the timing cam shaft 12. In Fig. 1, it can be seen that the operating rod 31 for the exhaust valve of cylinder B rides on tappet 32 which in turn rides directly on the cam 26 provided for such valve and attached to the timing cam shaft 12.

A suitable flywheel 33 is connected to the crank shaft 4 as seen in Fig. 1; and it is to be understood that either end of the crank shaft may be connected to a suitable load as desired.

Referring to Fig. 4 of the accompanying drawings, it will be seen that the crank shaft 4 has been merely indicated by a dash-dot line to illustrate the relative positions of the crank arms and connecting rods 7 and 8 for the cylinders A and B. Parallel with the crank shaft 4 is indicated the cam shaft 12 by a similar dash-dot line, and this cam shaft is indicated as being driven through suitable gears with a ratio of one/two, from the crank shaft. The cams 26, 27, 28, 29 and 30 are shown in their relative positions. The cam 26 operates the tappet for the exhaust of cylinder B; while the cam 28 operates the tappet for the intake valve of cylinder B. Similarly the cam 29 operates the tappet of the intake valve of cylinder A; while the cam 30 operates the tappet of the exhaust valve of cylinder A. The cam 27 operates the tappet for the crank case intake valve as above described.

As shown in Figs. 1, 2 and 4, the pistons 5 and 6 of the cylinders A and B respectively are in dead center positions; and the valves of the cylinders are assumed to be in condition for the cylinder A to fire and the cylinder B to intake. This is illustrated in Fig. 3 by considering that cylinder A is at the beginning of the intake stroke on the outer circle. By following the inner circle for cylinder A, it will be noted that the power stroke continues for a certain number of degrees at which time the cam shaft 12 has operated to such a position as to cause the exhaust stroke for cylinder A to take place; during the power stroke of cylinder A, the cylinder B is taking a charge during its so called intake stroke and then proceeds to compress such charge during its compression stroke. When the inner circle of cylinder A and the outer circle of cylinder B have been completed simultaneously, then the operation may be considered with respect to the outer circle for cylinder A and the inner circle for cylinder B. More specifically the cylinder A having completed its exhaust stroke proceeds on the outer circle to take a charge followed by the compression operation; while the cylinder B proceeds to fire and have its power strokes followed by the exhaust stroke.

This cyclic operation is well understood in the art, these diagrams are shown more particularly to indicate the relative conditions of the valves governed by the cams on the cam shaft for the different positions of the crank shaft as indicated in Fig. 4. It is also understood that variations may be made in the exact number of degrees for each of the functions above described with respect to each cylinder to obtain the optimum operating conditions for any given structure. The main point to note is that the cylinders are so timed that their firing times occur 180° apart with respect to the crank shaft to provide a balanced four cycle or four-stroke operation.

It will also be noted that the cam 27 operates the crank case intake valve once for each revolution of the crank shaft since a charge must be drawn into the crank case each time the pistons 5 and 6 move outwardly so that it can be compressed during the time that the pistons 5 and 6 move inwardly to provide a charge for transference to the next cylinder to perform its intake operation.

As above described, the charge of the crank case would appear to be substantially compressed before transference to either cylinder. However, it will be noted that during each such potential compression of the charge in the crank case, there is an intake operation with respect to one of the cylinders, so that the charge which has been taken into the crank case can be directly transferred to the appropriate cylinder with a minimum of actual compression. This is true, since compression is produced in the crank case only to that extent required to overcome the frictional losses of transference and to provide the pressure necessary to force the super-charge into the then intaking cylinder. Due to the fact that the capacity of each intaking cylinder is less than the displacement of both cylinders during the travel inwardly for the intake operation, there is a charge of substantially twice a usual charge forced into the cylinder without undue pressures being involved. This means that a minimum of difficulty is encountered in maintaining the crank case air tight for producing the required super-charging pressures. Also, it should be noted that the free space in the crank case is reduced to a minimum by proper design to provide a maximum compression action by the pistons as they move inwardly for effecting the gas mixture transference to the cylinder then taking a charge. This is accomplished in the present embodiment by the addition of balanced mass to the crank shaft as indicated at 3. This is more for effecting a rapid transference action than for actual compression, since it will be appreciated that if the total volume of the crank case is relatively large compared to the displacement of the pistons, it will tend to give a buffer action rather than a rapid transference.

From the above, it will be seen that an efficient super-charging of the cylinders is accomplished without undue pressures to be controlled, and in a simple manner. Also, such a super- charging organization readily follows the varying speeds of the engine without making it necessary to provide for over-run and the like, as in the case of most super-charging arrangements.

Having described a gas engine of the internal combustion supercharged type as one specific embodiment of the present invention, it is desired to be understood that this form is selected to facilitate in the disclosure of the invention rather than to limit the number of forms which it may assume; and, it will be further understood that various modifications, adaptations and alterations may be applied to the specific form shown to meet the requirements of practice, without in any manner departing from the spirit or scope of the present invention except as limited by the appended claims.

What I claim is:

1. In an internal combustion engine two cylinders oppositely disposed each having suitable pistons, a crank shaft having oppositely disposed cranks connected respectively to said pistons, whereby said pistons travel in opposite directions during the rotation of said shaft, said cylinders being attached to a crank case housing said shaft to form a substantially air tight compartment, intake and exhaust valves for each cylinder respectively operated by said shaft in accordance with the four-stroke principle, an intake valve for said crank case connected to a suitable carburetor, and external manifold ducts extending from said crank case outside of said cylinders to the intake valves of said cylinders.

2. In an internal combustion engine, a crank case having two oppositely disposed cylinders connected thereto each having suitable pistons, a crank shaft extending through said crank case and having oppositely disposed cranks connected respectively to said pistons within said cylinders, whereby said pistons travel in opposite directions during the rotation of said crank shaft, intake and exhaust valves for each cylinder respectively operated from said shaft in accordance with the four-stroke principle, in a manner to provide an intake stroke and a contemporaneous power stroke during each revolution of said shaft, an intake valve for said crank case for admitting a gas mixture charge during the outward travel of said two pistons, and manifold ducts connecting said crank case with the intake valves of said cylinder so as to provide for the transference of said gas mixture charge to said cylinders alternately during their respective intake strokes occurring while said pistons move inwardly, whereby the charge of each cylinder during its intake stroke is substantially twice the charge that would be provided by an atmospheric pressure supply.

3. In an internal combustion engine of the four-cycle type, two cylinders oppositely disposed on the opposite sides of an inclosed crank case compartment, a crank shaft extending through said crank case compartment having cranks oppositely disposed and connected respectively to pistons within said cylinders, intake and exhaust valves associated with each of said cylinders and operated by said crank shaft in accordance with the four-stroke principle to provide a power stroke for each revolution of said crank shaft, said cylinders being provided with suitable ignition means, an intake valve for said crank case compartment connected to a conventional carburator, and manifold ducts leading from said crank to the intake valves of said cylinders, whereby a gas mixture charge is taken in by said crank gas compartment during that portion of each revolution of said crank shaft that said pistons move outwardly, and transferred to that cylinder during the remainder of the revolution of the crank shaft while the pistons move inwardly which is then performing its intake function, whereby said cylinders are alternately supercharged with a gas mixture above atmospheric pressure.

4. In an internal combustion engine, a plurality of cylinders each provided with a piston having connecting rods joined to a crank shaft, intake and exhaust valves for each cylinder operated on the four stroke principle from said crank shaft, a chamber having an intake valve operated from said crank shaft and governing a manifold extending from a carburetor, an intake manifold extending from each cylinder to said chamber, means including said pistons for creating a gas mixture pressure in said chamber above atmospheric pressure, whereby said cylinders are supercharged, and means for firing each of said charged cylinders at the proper time in its four-cycle operation.

5. In an internal combustion engine, a plurality of cylinders each provided with a piston having connecting rods joined to a crank shaft, intake and exhaust valves for each cylinder operated on the four stroke principle from said crank shaft, a chamber having an intake valve operated from said crank shaft and governing a manifold extending from a carburetor, an intake manifold extending from each cylinder to said chamber, means including said pistons for causing gas mixture to be taken into said chamber from the manifold extending to its intake valve from the carburetor, said means also creating a gas mixture pressure in said chamber to substantially twice atmospheric pressure, whereby said cylinders are supercharged during their respective intake strokes, and means for firing each of said supercharged cylinders at the proper time in its four cycle operation to produce maximum power for rotation of the crank shaft.

6. In an internal combustion engine, a plurality of cylinders each provided with a piston and a connecting rod joining the piston to a crank shaft, intake and exhaust valves for the firing chamber of each cylinder operated on the four stroke principle from said crank shaft, an enclosed chamber having an intake valve operated from said crank shaft and governing a manifold extending from a carburetor, an intake manifold extending from said chamber to the firing chamber of each cylinder, means including said pistons acting within said cylinders on the sides opposite to the respective firing chambers for causing gas mixture to be taken into said enclosed chamber and raised to a pressure above atmospheric pressure to thereby provide a supercharge for each of said cylinders during their respective intake strokes, and means for firing each of said supercharged cylinders at the proper time in its four cycle operation.

7. In an internal combustion engine, a plurality of cylinders each provided with a piston and connecting rod joining the piston to a crank shaft which is horizontally located with respect to a suitable crank case, intake and exhaust valves located in the head of each cylinder, an intake manifold extending from the crank case to a suitable carburetor and governed by an intake valve, external intake manifolds connected to said crank case above the center line defined by the horizontal crank shaft and extending to the intake valves of the cylinders, means including said pistons acting within said cylinders on their sides opposite to their respective firing chambers for causing gas mixture to be taken into said crank case and transferred under pressure to the respective cylinders during their respective intake strokes in a manner to provide a supercharge for each of said cylinders, and means for firing each of said supercharged cylinders at the proper time in its four-stroke operation.

8. In an internal combustion engine, a crank case having two oppositely disposed cylinders connected thereto each having suitable pistons, a crank shaft extending through said crank case and having oppositely disposed cranks connected by suitable connecting rods respectively to said pistons, whereby said pistons travel in opposite directions during the rotation of said crank shaft, said crank shaft and cranks carrying added mass to effectively reduce the free space within said crank case, intake and exhaust valves located in the heads of said cylinders and respectively operated from said crank shaft in accordance with the four-stroke principle, an intake valve for said crank case for admitting a gas mixture during the outward travel of said two pistons, and manifold ducts connecting said crank case with the intake valves of said cylinder so as to provide for the transference of said gas mixture to said cylinders alternately during their respective intake strokes occurring while said pistons move inwardly, whereby the charge of each cylinder is substantially increased above atmospheric pressure by reason of the relatively small amount of free space in said crank case relative to the space displaced by said pistons on their sides facing the crank case.

9. In an internal combustion engine, two cylinders oppositely disposed each having suitable pistons, a crank shaft having oppositely disposed cranks connected respectively to said pistons, whereby said pistons travel in opposite directions during the rotation of said shaft, said cylinders being attached to a crank case forming a substantially airtight compartment, intake and exhaust valves located in the head of each cylinder and respectively operated by said shaft in accordance with the four-stroke principle and arranged so that the intake valve of a cylinder is opened immediately following the completion of the exhaust stroke of the piston for that cylinder, an intake valve for said crank case connected to a suitable carburetor, and external manifold ducts connected to said crank case and extending to the intake valves of said cylinders.

10. In an internal combustion engine, a crank case having two oppositely disposed cylinders connected thereto each having suitable pistons, a crank shaft extending through said crank case and having oppositely disposed cranks connected respectively to said pistons whereby said pistons move in opposite directions during rotation of said crank shaft, intake and exhaust valves of the poppet type located in the head of each cylinder and respectively operated from said shaft in accordance with the four-stroke principle to give contemporaneous intake and power strokes during each revolution of said shaft, an intake valve for said crank case for admitting a gas mixture charge during each outward movement of said pistons, and external manifold ducts connecting said crank case with said intake valves of said cylinders to effect the transference of said gas mixture charge to said cylinders alternately and throughout their respective intake strokes occurring while said pistons move inwardly.

11. In an internal combustion engine, two cylinders oppositely disposed each having suitable pistons, a crank shaft having oppositely disposed cranks connected respectively to said pistons, whereby said pistons travel in opposite directions during the rotation of said shaft, said cylinders being attached to a crank shaft housing, said shaft to form a substantially air-tight compartment, intake and exhaust valves for each cylinder respectively operated by said shaft in accordance with the four-stroke principle, said intake valves being maintained open for substantially a full intake stroke for their respective pistons, an intake valve for said crank case connected to a suitable carburetor, and external manifold ducts extending from said crank case to the intake valves of said cylinders, whereby the gas mixture taken into said crank case is transferred to said cylinders alternately during their respective intake strokes with a minimum of pressure in said crank case since the transference can take place throughout the intake stroke of each cylinder.

12. In an internal combustion engine, a crank case enclosure having only two cylinders connected thereto, a crank shaft extending through said crank case enclosure and having oppositely disposed cranks within said enclosure, a suitable piston within each cylinder and connected to its respective crank on said shaft, whereby said pistons travel in opposite directions during the rotation of said shaft, intake and exhaust valves of the poppet type located in the head of each cylinder and operated by said crank shaft in accordance with the four-stroke principle, said intake valve of each cylinder being initially opened for the intake stroke of its piston at dead center for its respective crank and being closed at the end of such intake stroke, external manifold ducts connected between said crank case enclosure and said intake valves of said cylinders, an intake valve for said crank case operated from said shaft for governing a manifold connecting said crank case enclosure to a conventional carburetor and opened only during the outward travel of said pistons, whereby a gas mixture charge is taken into said crank case enclosure during each outward travel of said pistons and is then transferred throughout the inward travel of said pistons to the particular cylinder then having an intake stroke, a throttle valve for variably governing the amount of each gas mixture charge taken into said crank case enclosure, and means for firing each cylinder at the proper time in its four-stroke operation, whereby said engine is operable on gas mixture charges which are variable from a minimum up to a supercharge substantially above atmospheric pressure independently of the speed of the engine.

HERBERT H. HARMON.

REFERENCES CITED

The following references are of record in the file of this patent:

UNITED STATES PATENTS

| Number | Name | Date |
| --- | --- | --- |
| 1,764,386 | Brockway et al. | June 17, 1930 |
| 2,386,607 | Heintz | Oct. 9, 1945 |